United States Patent
Bradley et al.

(10) Patent No.: US 8,020,676 B2
(45) Date of Patent: Sep. 20, 2011

(54) TONE RING FOR AN ANTI-LOCK BRAKE SYSTEM

(75) Inventors: James C. Bradley, New Haven, IN (US); Bradley S. Carlson, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 481 days.

(21) Appl. No.: 12/188,845

(22) Filed: Aug. 8, 2008

(65) Prior Publication Data

US 2010/0032251 A1    Feb. 11, 2010

(51) Int. Cl.
*F16D 65/12* (2006.01)

(52) U.S. Cl. ............... 188/218 XL; 188/18 A; 324/173

(58) Field of Classification Search ............ 188/218 XL, 188/18 A, 18 R, 181 A, 181 R; 301/105.1; 324/173, 174, 207.21, 207.22, 207.25
See application file for complete search history.

(56) References Cited

U.S. PATENT DOCUMENTS

| | | | |
|---|---|---|---|
| 5,569,543 A | 10/1996 | Schaffer | |
| 5,719,497 A * | 2/1998 | Veeser et al. | 324/174 |
| 6,568,512 B1 | 5/2003 | Tolani | |
| 6,642,709 B2 | 11/2003 | Heimann | |
| 7,306,293 B2 | 12/2007 | Redgrave | |
| 7,487,862 B2 | 2/2009 | Carlson | |
| 2003/0122539 A1 | 7/2003 | Hemann, Jr. | |
| 2007/0051571 A1 | 3/2007 | Carlson | |
| 2008/0099288 A1 * | 5/2008 | Burgoon et al. | 188/218 XL |

FOREIGN PATENT DOCUMENTS

JP    2005-121669    5/2005

* cited by examiner

*Primary Examiner* — Pamela Rodriguez
(74) *Attorney, Agent, or Firm* — Jeffrey P. Calfa; Mark C. Bach

(57) ABSTRACT

An ABS tone ring is made of a thermo-set plastic material transparent to electro-magnetic radiation. A plurality of discrete, spaced magnets or ferro-magnetic buttons is arrayed in a circle, embedded in the tone ring. The thermo-set plastic is heat tolerant and resistant to road salt and oxidation and protects the magnets or buttons from oxidation and corrosion.

4 Claims, 5 Drawing Sheets

TONE RING FOR AN ANTI-LOCK BRAKE SYSTEM

BACKGROUND OF THE INVENTION

1. Technical Field

The present invention relates to motor vehicle brake systems and more particularly to a corrosion immune anti-lock brake system exciter/tone ring for a wheel hub in a drum brake system or a disk rotor.

2. Description of the Problem

Brake units for motor vehicles should provide smooth braking with reasonable service life. Friction brakes have long been used due to their ease of construction, reliability and consistent performance. Some of the components in such brakes and related portions of the vehicle's wheels have been made from relatively inexpensive gray iron castings. Gray iron is however highly susceptible to corrosive attack, particularly in the operating environment of vehicles where brake components are open to the air, subject to substantial transient heating and exposed to water and salt water spray. One application of gray iron has been to disk rotors. In regular use, the working surfaces of the disks are rubbed clean by contact with the disk pads, which are typically made of a composite material and which rub off corroded areas of the disk. However other areas of the brake disks are not swept by the brake pads and thereby cleaned of corrosion and oxidation. Similarly wheel hubs on vehicles equipped with drum brakes have been subject to corrosive and oxidizing attack. Prior to anti-lock braking systems, such concerns were not paramount because the surface areas of the structures subject to attack were not critical to brake function or wheel integrity.

With the advent of anti-lock braking systems surface integrity of wheel components can take on importance. For disk brake systems typically a portion of the disk rotor has been cast with, or machined to exhibit, a surface contour allowing the rotor to serve as an exciter ring for the ABS system. The exciter ring is a cylindrical section of the rotor having a common axis of rotation with the wheel and which is shaped as a series of teeth positioned in a ring, flat in the plane of rotation of the wheel and oriented to pass closely by a stationary magnetic sensor. The stationary sensor is a variable reluctance sensor which generates an electrical pulse train as a function of the varying magnetic flux leakage between the sensor head and the exciter ring. The frequency of the resulting electrical pulse train indicates the rotational speed of the wheel and large non-continuous changes in wheel rotational speed are taken as indicating skidding of the wheel. The generation of clean pulse train is greatly aided by having teeth of uniform shape and size so that the spacing of the teeth from and the surface area present by the teeth to the sensor is uniform. Corrosion or oxidation of the iron forming on the surfaces of the teeth compromises these factors, resulting in difficulty in detecting the passage of teeth by the sensor. This in turn can make it difficult to qualify pulses and possible corruption of the resulting pulse train.

Corrosion protection coatings have been proposed for use with cast iron exciter rings. Such coatings are described in U.S. Pat. No. 5,569,543. Other corrosion inhibiting coatings have been supplied by Magni Corp., including the Magni 109 and Magni 111 coatings. Such coatings can be easily compromised when applied to exciter rings since the sensor usually needs to pass within very close proximity to the teeth and, consequently, the chance exists for removal of the coating from the teeth, which again leaves the teeth exposed to corrosive agents or oxidation. In addition, such coatings are relatively expensive.

The problem of corrosion and its implications for vehicle ABS systems manifests itself somewhat differently with drum brake equipped vehicles. For drum brakes the exciter ring has not been an integral part of any part of the working brake, but rather has been a separate part press fitted on the end of a wheel hub. Press fitted rings can be made of ferromagnetic materials less susceptible to attack that iron, such as steel, however, even these materials are not immune from such problems.

Japanese Patent Publication 2005121669 discloses a tone ring for a rolling bearing unit where powdered ferromagnetic material is dispersed in a composite material such as rubber and elastomer.

SUMMARY OF THE INVENTION

The invention provides an ABS tone ring comprising a plurality of discrete, spaced magnets or ferro-magnetic buttons arrayed in a thermo-set plastic ring. The thermo-set plastic is transparent to electromagnetic waves and is heat tolerant and resistant to road salt and oxidation.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
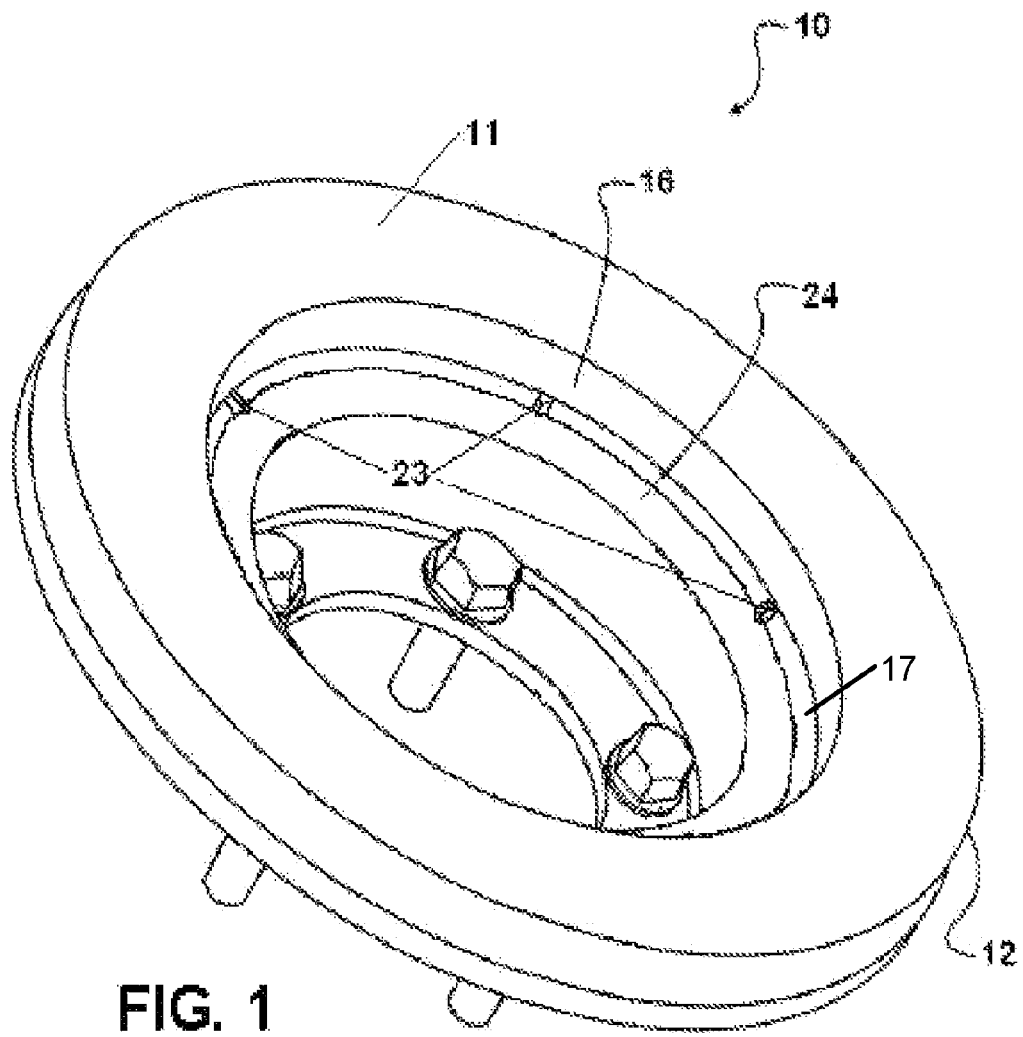
FIG. 1 is a perspective view of a disk brake rotor.

Referring now to the figures and in particular to FIG. 1, a disk brake rotor assembly 10 is shown. The primary component of rotor assembly 10 is a rotor 12, which includes a central recess 16, which is centered on the axis of rotation of the rotor. Ringing the central recess 16, depressed from a major surface 11 is a shelf 24. Shelf 24 is formed in rotor 12 during casting and may be finished by machining. Shelf 24 is ringed by a plurality of inwardly oriented tangs 23, which extend from an inner bore 17 surrounding the shelf. The number of tangs 23 is variable and they are intended to engage the tone ring 14 of the invention to retain it on the rotor 12 and to prevent the tone ring from clocking on the rotor. Rotor 12 is a gray iron casting, possibly finished by machining. Rotor 12 provides a wearable surface 11 which pads of the disk brake close on and wear against.

Figure 2:
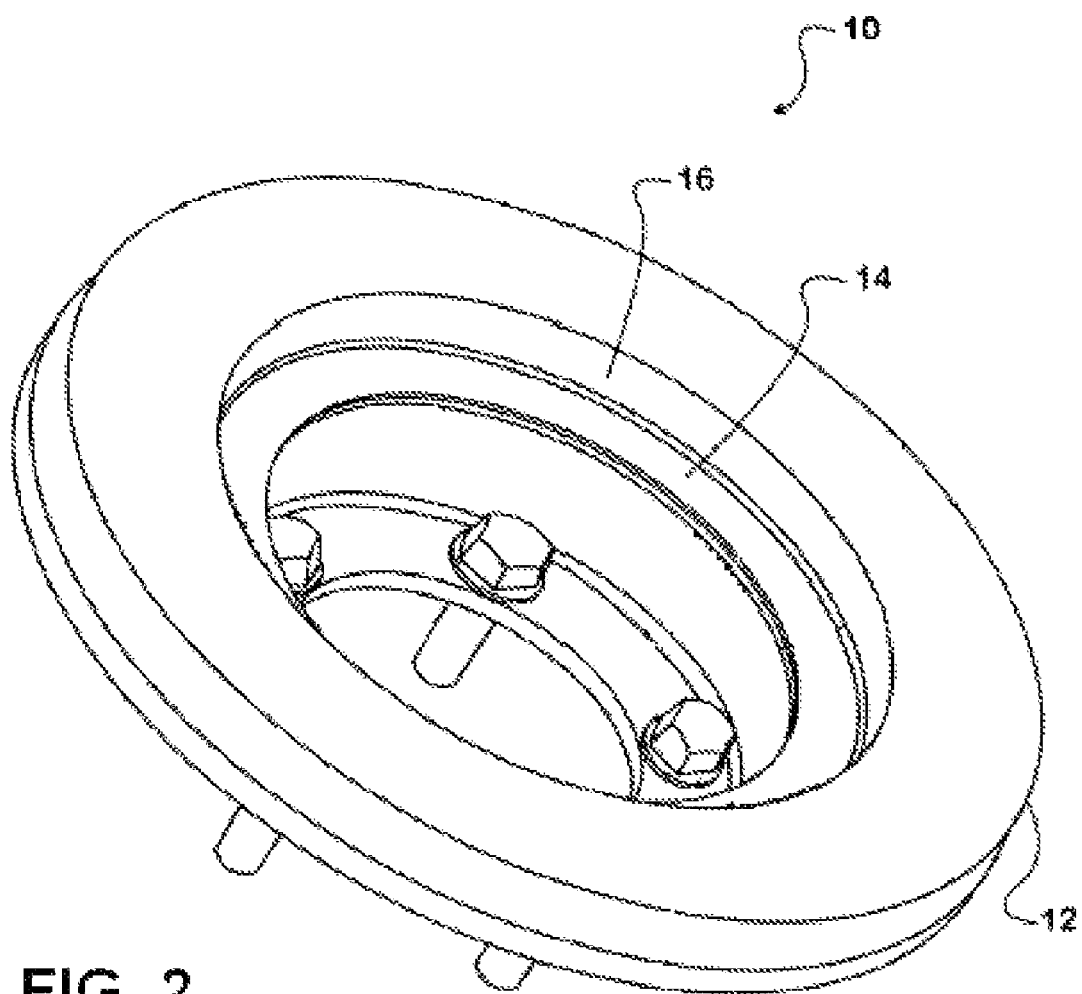
FIG. 2 is a perspective view of a disk brake rotor and anti-lock brake system tone ring.

FIG. 2 illustrates positioning of a tone ring 14 on shelf 24 within central recess 16 of rotor 12. The tone ring 14 is centered on the intended axis of rotation of the rotor 12 and is made of a thermo-set plastic selected for high temperature resistance. Due to the high temperatures potentially encountered by disk brake rotors the preferred application of the invention is to wheel hubs for use in drum brake systems where less expensive plastics exhibiting adequate heat resistance for the application may be utilized. The tone ring 14 is ideally made of a nonmagnetic material transparent to electro-magnetic waves. As a practical matter it is expected that the material will be of a weak paramagnetic character. For convenience of nomenclature both will be referred to here as nonmagnetic.

Figure 3:
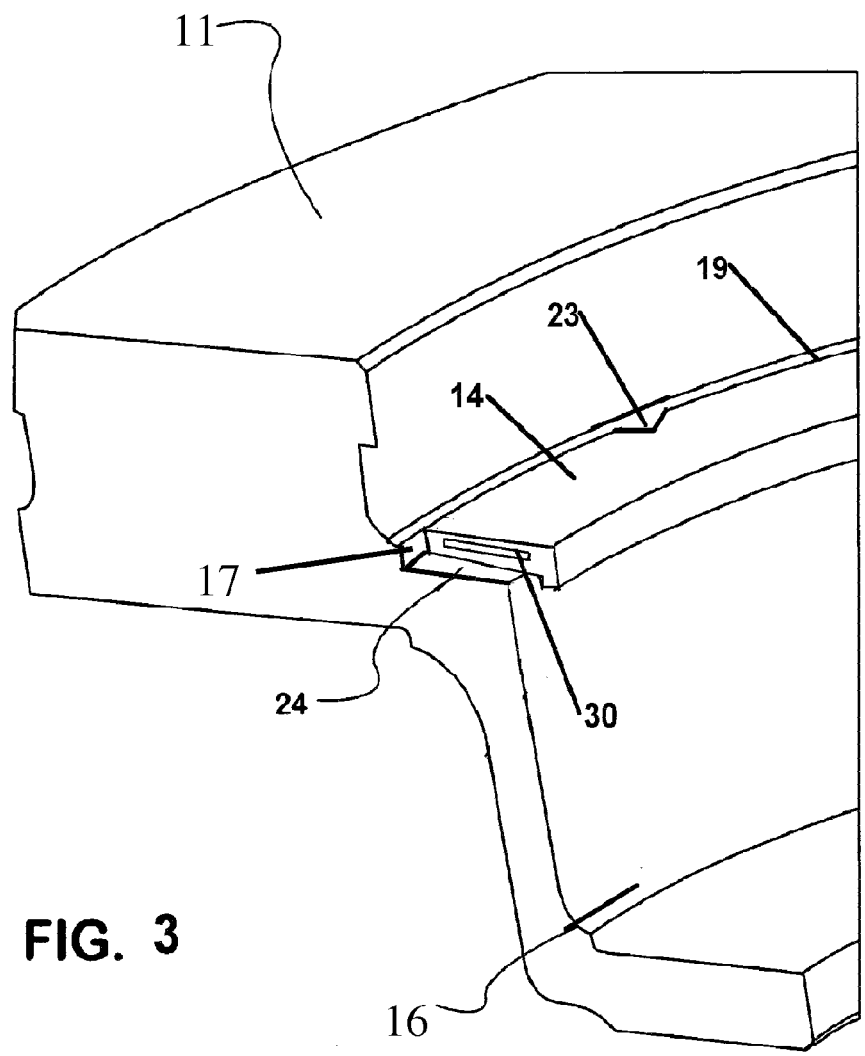
FIG. 3 is a partial cross sectional view of a disk brake rotor and tone ring.

Referring to FIG. 3, tone ring 14 lies along one major side on shelf 24. A tang 23 indents an outer circumferential edge 19 of tone ring 14 for retaining the tone ring. Embedded within tone ring 14 is a discrete magnet or button of ferromagnetic material which can be detected by an electromagnet based sensor (not shown) passing over the surface of the tone ring.

Figure 4:
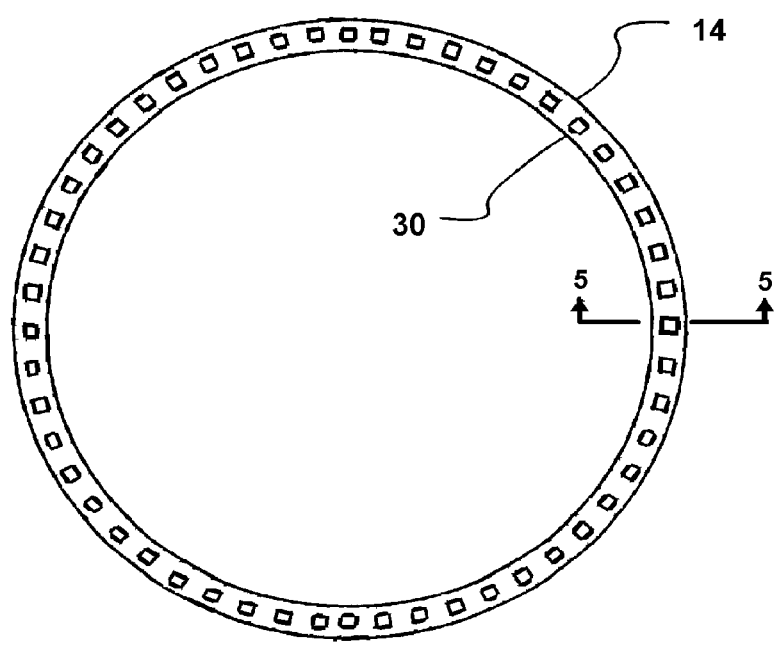
FIG. 4 is a plan view of a tone ring for a disk brake rotor.
Figure 5:
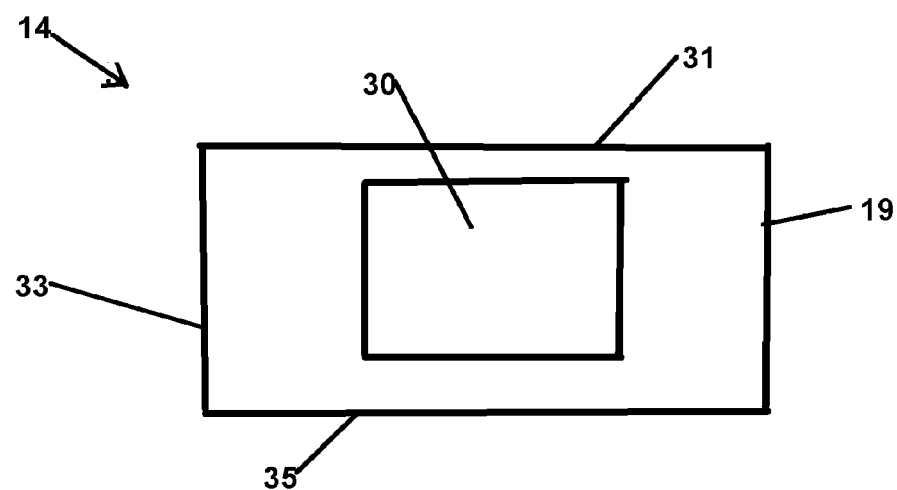
FIG. 5 is cross sectional view of a tone ring taken along section lines 5-5 in FIG. 4.

FIG. 4 is a plan view of tone ring 14 showing the distribution of magnetically active buttons 30 distributed radially around the ring. FIG. 5, a cross sectional view of tone ring 14 taken along section lines 5-5 in FIG. 4, illustrates that buttons 30 are embedded with the rings spaced from the inner and outer edges 33, 19 of the tone ring 14, as well as the top and bottom major surfaces 31, 35.

Figure 7:
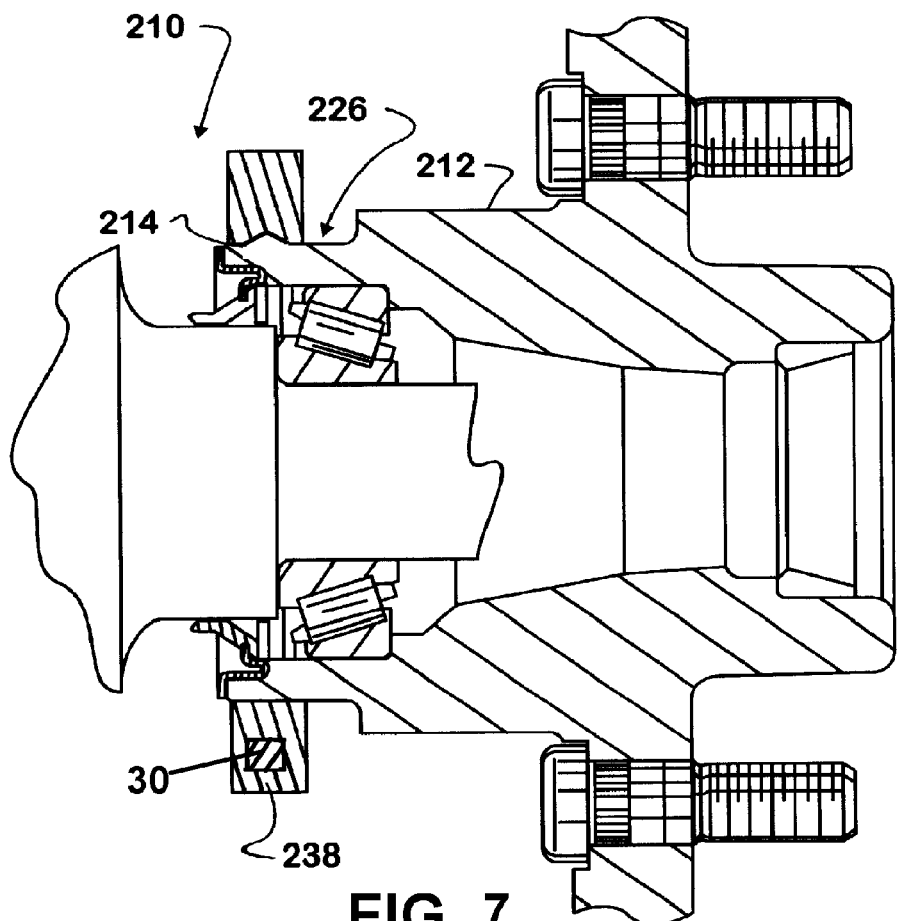
FIG. 7 is cross sectional view of a wheel hub.
Figure 6:
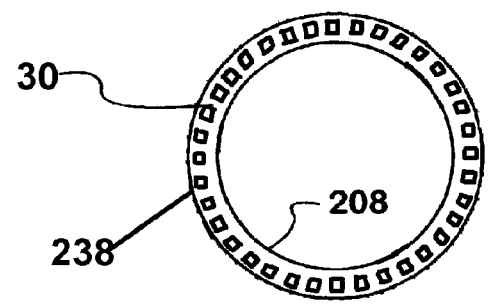
FIG. 6 is a plan view of a tone ring for a wheel hub for use in a drum brake system.

FIGS. 6 and 7 illustrate a preferred embodiment of the invention. A wheel hub assembly 210 is equipped with a drum brake (not shown) employing an anti-lock brake system. The inner surface cylindrical surface 208 of tone ring 238 is impinged by ring mounting tangs 214, which point outwardly from an end portion 226 of a cast iron hub member 212. Tone ring 238 is corrosion and oxidation resistant thermo-set plastic band which is transparent to electro-magnetic radiation. A plurality of buttons 30, which are either magnetic, or made of a ferro-magnetic material are embedded within the ring 238, conventionally arrayed in a circle which rotates on the axis of rotation of the hub member 212. In theory any repeating pattern of buttons arrayed in a circle could be made to function to generate a pulse train, however, conventionally, the buttons are evenly spaced.

The tone ring of the invention is relatively immune to oxidation and corrosion, and protects magnetic elements which are subject to such attack within a protective matrix.

While the invention is shown in only a few of its forms, it is not thus limited but is susceptible to various changes and modifications without departing from the spirit and scope of the invention.

What is claimed is:

1. A tone ring for an anti-lock brake system comprising:
    a matrix of a nonmagnetic material in the form of a ring having inner and outer edges and top and bottom major surfaces; and
    a plurality of discrete, magnetically active buttons arrayed as a repeating pattern in which the magnetically active buttons are spaced from one another and disposed around the ring and in which the magnetically active buttons are embedded in the matrix where they are spaced from the inner and outer edges and from the top and bottom surfaces of the ring.

2. A tone ring as set forth in claim 1, further comprising the nonmagnetic material being thermo-set plastic.

3. A tone ring as set forth in claim 1, further comprising:
    the ring being mounted on a wheel hub for a drum brake system.

4. A tone ring as set forth in claim 1, further comprising:
    the ring being mounted on a disk brake rotor.

\* \* \* \* \*